United States Patent
Faber et al.

(10) Patent No.: US 11,124,669 B2
(45) Date of Patent: Sep. 21, 2021

(54) STORAGE STABLE QUICKSETTING COATING SYSTEM THAT IS FREE OF VOLATILE-BASE

(71) Applicant: Rohm and Haas Company, Collegeville, PA (US)

(72) Inventors: Katherine A. Faber, Gilbertsville, PA (US); Drew E. Williams, Norristown, PA (US); David M. Conner, Dresher, PA (US); Mark D. Westmeyer, Collegeville, PA (US)

(73) Assignee: Rohm and Haas Company, Collegeville, PA (US)

( * ) Notice: Subject to any disclaimer, the term of this patent is extended or adjusted under 35 U.S.C. 154(b) by 148 days.

(21) Appl. No.: 16/624,019

(22) PCT Filed: Jun. 20, 2018

(86) PCT No.: PCT/US2018/038402
§ 371 (c)(1),
(2) Date: Dec. 18, 2019

(87) PCT Pub. No.: WO2019/005543
PCT Pub. Date: Jan. 3, 2019

(65) Prior Publication Data
US 2020/0109308 A1 Apr. 9, 2020

Related U.S. Application Data

(60) Provisional application No. 62/525,851, filed on Jun. 28, 2017.

(51) Int. Cl.
| | | |
|---|---|---|
| *C09D 133/08* | (2006.01) |
| *C08K 3/013* | (2018.01) |
| *C08K 3/22* | (2006.01) |
| *C08K 3/26* | (2006.01) |
| *C08K 3/34* | (2006.01) |
| *C08L 1/02* | (2006.01) |
| *C08L 29/04* | (2006.01) |
| *C08L 39/06* | (2006.01) |
| *C09D 125/08* | (2006.01) |
| *C09D 133/02* | (2006.01) |
| *C09D 133/10* | (2006.01) |
| *C09D 133/14* | (2006.01) |
| *C09D 179/02* | (2006.01) |

(52) U.S. Cl.
CPC ............ *C09D 133/08* (2013.01); *C08K 3/013* (2018.01); *C08K 3/22* (2013.01); *C08K 3/26* (2013.01); *C08K 3/346* (2013.01); *C08L 1/02* (2013.01); *C08L 29/04* (2013.01); *C08L 39/06* (2013.01); *C09D 125/08* (2013.01); *C09D 133/02* (2013.01); *C09D 133/10* (2013.01); *C09D 133/14* (2013.01); *C09D 179/02* (2013.01); *C08K 2003/265* (2013.01); *C08K 2201/003* (2013.01)

(58) Field of Classification Search
CPC .. C09D 125/08; C09D 133/02; C09D 133/08; C09D 133/10; C09D 133/14; C09D 179/02; C08K 3/013; C08K 3/26; C08K 3/346; C08L 1/02; C08L 29/04; C08L 39/06
See application file for complete search history.

(56) References Cited

U.S. PATENT DOCUMENTS

| | | |
|---|---|---|
| 3,037,969 A | 6/1962 | Hankins |
| 3,497,485 A | 2/1970 | Emmons |
| 4,119,600 A | 10/1978 | Bakule et al. |
| 5,219,914 A | 6/1993 | Warburton, Jr. |
| 5,527,853 A | 6/1996 | Landy et al. |
| 5,672,379 A | 9/1997 | Schall et al. |
| 5,705,560 A | 1/1998 | Takarabe et al. |
| 5,804,627 A | 9/1998 | Landy et al. |
| 5,849,833 A | 12/1998 | Puschak et al. |
| 5,861,188 A | 1/1999 | Schall et al. |
| 6,013,721 A | 1/2000 | Schall et al. |
| 6,277,437 B1 | 8/2001 | Helmer et al. |
| 6,376,574 B1 | 4/2002 | Helmer et al. |
| 6,475,556 B1 | 11/2002 | Sobczak et al. |
| 6,531,538 B1 | 3/2003 | Weitzel et al. |
| 7,071,260 B1 | 7/2006 | Kuropka et al. |
| 7,897,669 B2 | 3/2011 | Foerg et al. |
| 8,641,846 B2 | 2/2014 | Parsons et al. |
| 9,303,183 B1 | 4/2016 | Greer |
| 2003/0224184 A1 | 12/2003 | Hermes et al. |
| 2008/0171810 A1* | 7/2008 | Matthews ............... C09D 5/004 523/172 |
| 2009/0176127 A1* | 7/2009 | Matthews ............. C09D 143/02 428/704 |
| 2014/0242279 A1 | 8/2014 | Saugata et al. |
| 2015/0259559 A1 | 9/2015 | Petrie et al. |

FOREIGN PATENT DOCUMENTS

| | | |
|---|---|---|
| EP | 798350 B1 | 9/1999 |
| EP | 1362896 B1 | 7/2006 |
| EP | 1947148 A2 | 7/2008 |
| EP | 2077305 A2 | 7/2009 |
| JP | 2007091915 | 4/2007 |
| WO | 1998001237 | 1/1998 |
| WO | 2013182444 | 12/2013 |
| WO | 2015158588 | 10/2015 |

* cited by examiner

Primary Examiner — Edward J Cain

(57) ABSTRACT

A formulation contains an anionically stabilized dispersion of polymer particles, a polymeric polyamine and an inorganic filler has a pH in a range of 6.0 to 8.5, viscosity greater than 15000 centipoise, and is free of volatile base, aminosilanes, and quaternary poly(allylamine).

10 Claims, No Drawings

STORAGE STABLE QUICKSETTING COATING SYSTEM THAT IS FREE OF VOLATILE-BASE

BACKGROUND OF THE INVENTION

Field of the Invention

The present invention relates to a single formulation coating system that is free of volatile-base yet demonstrates both storage stability and quicksetting properties. The formulation comprises an anionically stabilized dispersion binder, a polymeric polyamine and inorganic filler.

Introduction

Single formulation waterborne sealants and coatings have historically either had storage stability or had a rapid setting characteristics. Generally, if a coating system has long storage stability, it also has a long set time and vice versa. However, the industry desires a system that has both long storage stability as well as rapid setting characteristics. Storage stability provides longevity for shipment and storage. Rapid setting is desirable so that that when a system is applied it rapidly becomes stable and resistant to rain, abrasion, dripping/running and other detrimental effects that a coating can experience while in a fluid state.

WO1998001237 discloses a method for achieving rapid setting of a coating by first applying a coating of a binder dispersion and then spraying a polyamine onto the binder coating to cause it to set up. The binder dispersion is kept separate from the polyamine until after the binder has been applied. Therefore, application of the coating and achieving rapid setting up requires applying two different materials. It is desirable to have a single formulation with both long storage stability and rapid set-up.

To address the need to simultaneously achieve long storage stability and rapid set times with a single formulation, systems have been developed that utilize pH triggered chemistry to set up. The system remains stable when basic and then set up when the pH drops. The pH drop is triggered after application of the system as volatile base evaporates from the system thereby lowering the pH of the system. See, for example, the systems of U.S. Pat. Nos. 5,527,853, 5,861,188, 6,013,721 and US2015/0259559 which disclose anionically stabilized polymer particles in combination with poly-functional amine polymers that are stabilized by volatile base. As the volatile base evaporates the system ceases to be stabilized and the polymer particles react with the amine functionalities to set up the system.

Volatile bases can be undesirable in coating formulations. Volatile bases often have an odor that causes formulations containing the volatile base to have an odor when applied as a coating. Typically, volatile bases are considered as having an unpleasant odor. Therefore, it is desirable to identify an anionically stabilized polymer/poly-functional amine system that is a single formulation that has both storage stability and a rapid set time upon application but that does not require the a volatile base to achieve storage stability.

BRIEF SUMMARY OF THE INVENTION

The present invention provides a solution to the problem of an anionically stabilized polymer/poly-functional amine system that is a single formulation that has both storage stability and a rapid set time upon application but that does not require the a volatile base to achieve storage stability.

Surprisingly, the present invention is a result of discovering a formulation for an anionically stabilized polymer/poly-functional amine system that remains storage stable in aged storage testing and yet passes early washout resistance testing signifying rapid setting upon application without use of a volatile base. In fact, even more surprisingly, the systems of the present invention can have a pH of 7.5 or lower and even below 7.0 and still achieve storage stability and early washout resistance upon application.

Without being bound by theory, a possible reason for the present invention achieving the surprising performance of both storage stability and rapid setting up on application in a single formulation that is free of volatile base is in the low concentration of polymeric polyamine and the viscosity properties of the formulation. The polymeric polyamine presumably reacts with the binder polymer during storage, but fails to readily complete crosslinking between polymer particles due to the relatively low concentration of the polymeric polyamine and the hindered mobility of the polymer particles due to the relatively high viscosity characteristics of the formulation. Upon application of the formulation as a coating, water evaporates and drives the polymer particles together despite the relatively high viscosity to facilitate completing the crosslinking required to set up the coating.

In a first aspect, the present invention is a formulation comprising in a single formulation the following three components: an anionically stabilized dispersion of polymer particles, a polymeric polyamine and a inorganic filler wherein: (a) the polymer particles of the anionically stabilized dispersion are present at a concentration of 28 weight-percent or more and at the same time 45 weight-percent or less based on total weight of the formulation as determined by ASTM E1131-08; (b) the polymer particles of the anionically stabilized dispersion comprise polymers selected from a group consisting of (meth)acrylic polymers and styrene-acrylic copolymers; the polymers containing on average (i) 0.7 weight-percent or more and 5.0 weight-percent or less polymerized acrylic acid based on total weight of all monomers in the polymer; and (ii) 0.1 weight-percent or more and 5.0 weight-percent or less of polymerized acid other than acrylic acid based on total weight of all monomer in the polymer; (c) the polymer particles of the anionically stabilized dispersion (i) have an average particle size of 200 nanometer or more and 600 nanometer or less as determined by 90-degree light scattering using a Malvern Zetasizer Nano ZS90; and (ii) have an average glass transition temperature of −55 degrees Celsius or more and 20 degrees Celsius or less as determined according to ASTM E-1356-08; (d) the concentration of polymeric polyamine is 0.05 weight-percent or more and less than 1.0 weight-percent based on total weight of polymer in the formulation as determined by pyrolysis headspace gas chromatography; (e) the inorganic filler concentration is 10 volume-percent or more and 45 volume-percent or less based on total volume of the formulation as determined by ASTM method D5201-05a; (f) the formulation is 60 volume-percent or more and 70 volume-percent or less solids as determined by ASTM D5201-05a; (g) the formulation has a viscosity greater than 15000 centipoise; and wherein, if the formulation comprises a rheology modifier thickener, the rheology modifier is a nonionic volume exclusion thickener; wherein the anionic stabilized dispersion of polymer particles is free of aminosilanes; wherein the formulation is free of volatile base and quaternary poly(allylamine); wherein the formulation has a pH of 6.0 or higher and 8.5 or lower as determined by ASTM E-70; and wherein viscosity values are determined using a Brookfield viscometer model DV-I+ at 5 revolutions per minute using a Helipath Spindle E at 22 degrees Celsius.

The formulation of the present invention is useful, for example, as a coating and/or sealant.

DETAILED DESCRIPTION OF THE INVENTION

"And/or" means "and, or alternatively". Ranges include endpoints unless otherwise stated.

Test methods refer to the most recent test method as of the priority date of this document unless a date is indicated with the test method number as a hyphenated two digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standardization.

Determine viscosity values using a Brookfield viscometer model DV-I+ at five revolutions per minute using a Helipath Spindle E at 22 degrees Celsius.

The present invention is a single formulation, which means the components of the single formulation exist in contact with one another during storage and during application. A single formulation is in contrast to, for example, a composition where a binder is stored separate from an amine setting agent and the two are mixed so as to be in contact only during application or after application of the binder.

The single formulation of the present invention comprises an anionically stabilized dispersion of polymer particles, a polymeric polyamine and an inorganic filler.

The anionically stabilized dispersion comprises polymer particles dispersed in an aqueous (water-continuous) phase. "Anionically stabilized" with respect to the dispersion of polymer particles means that the polymer particles of the dispersion have a net negative charge in the formulation. The net negative charge helps to stabilize the dispersion by hindering contact between the individual polymer particles. The net negative charge can be from, for example, negatively charged portions of the polymer composition itself (for example, deprotonated acid functionalities), from anionic surfactants or both from negatively charged portions of the polymer composition and from anionic surfactants.

The polymer particles of the anionically stabilized dispersion are present at a concentration of 28 wt % or more, preferably 30 wt % or more and at the same time 50 wt % or less, typically 45 wt % or less and can be 40 wt % or less based on the total weight of the formulations. Determine the wt % polymer particles based on formulation weight according to ASTM E1131-08 where the polymer particles correspond to the "polymer component" in that method when evaluating the formulation.

The polymer particles of the anionically stabilized dispersion comprise polymer selected from a group consisting of (meth)acrylic polymers and styrene-acrylic polymers. As used herein, "polymer" refers to polymeric materials comprising any number of different monomers. Herein, "(meth)acrylic" means "methacrylic and/or acrylic". Methacrylic polymers contain polymerized methacrylate monomers. Acrylic polymers contain polymerized acrylate monomers.

Exemplary (meth)acrylic polymers include polymers comprising polymerized monomers selected from a group consisting of methyl acrylate, methyl methacrylate, ethyl acrylate, ethyl methacrylate, butyl acrylate, butyl methacrylate, isobutyl methacrylate, n-hydroxyl(meth)acrylate, ethylhexyl (meth)acrylate, n-heptyl (meth)acrylate), ethyl (meth)acrylate, 2-methylheptyl (meth)acrylate, octyl (methyl)acrylate, isooctyl (meth)acrylate, n-nonyl (meth) acrylate, isononyl (meth)acrylate, n-decyl (meth)acrylate, isodecyl (meth)acrylate, dodecyl (meth)acrylate, lauryl (meth)acrylate, tridecyl (meth)acrylate, stearyl (meth)acrylate, glycidyl (meth)acrylate, alkyl crotonates, di-n-butyl maleate, di-octylmaleate, acetoacetoxyethyl (meth)acrylate, acetoacetoxypropyl (meth)acrylate, hydroxyethyl (meth) acrylate, allyl (meth)acrylate, tetrahydrofurfuryl (meth) acrylate, cyclohexyl (meth)acrylate, 2-ethoxyethyl (meth) acrylate, 2-methoxy (meth)acrylate, 2-(2-ethoxy-ethoxy) ethyl (meth)acrylate, 2 ethylhexyl (meth)acrylate, 2-propylheptyl (meth)acrylate, 2-phenoxyethyl (meth)acrylate, polypropyleneglycol mono(meth)acrylate, polyethyleneglycol (meth)acrylate, benzyl (meth)acrylate, 2,3-epoxycyclohexylmethyl (meth)acrylate, hydroxypropyl (meth) acrylate, methylprolyglycol (meth)acrylate, 3,4-epoxycyclohexylmethyl (meth)acrylate, 1,6 hexanediol di(meth)acrylate, 1,4 butanediol di(meth)acrylate and for copolymer, combinations thereof.

The polymers of the polymer particles in the anionically stabilized dispersion further contain polymerized acrylic acid at a concentration of on average 0.7 weight-percent (wt %) or more and can have 1.0 wt % or more, 1.2 wt % or more 1.4 wt % or more, 1.6 wt % or more, 1.8 wt % or more, 2.0 wt % or more, 2.2 wt % or more, 2.4 wt % or more, 2.6 wt % or more, 2.8 wt % or more, 3.0 wt % or more, 3.2 wt % or more, 3.4 wt % or more, 3.6 wt % or more, 3.8 wt % or more, 4.0 wt % or more 4.2 wt % or more and even 4.4 wt % or more while at the same time contain 5.0 wt % or less and can contain 4.8 wt % or less, 4.6 wt % or less, 4.4 wt % or less, 4.2 wt % or less, 4.0 wt % or less, 3.8 wt % or less, 3.6 wt % or less, 3.4 wt % or less, 3.2 wt % or less, 3.0 wt % or less, 2.8 wt % or less, 2.6 wt % or less, 2.4 wt % or less, 2.2 wt % or less, 2.0 wt % or less, and even 1.8 wt % or less based on total weight of all monomers in the polymer.

The polymers of the polymer particles in the anionically stabilized dispersion contain a copolymerized co-acid other than acrylic acid in addition to the polymerized acrylic acid at a concentration of 0.1 wt % or more and can contain 0.25 wt % or more, 0.4 wt % or more, 0.6 wt % or more, 0.8 wt % or more 1.0 wt % or more, 1.2 wt % or more 1.4 wt % or more, 1.6 wt % or more, 1.8 wt % or more, 2.0 wt % or more, 2.2 wt % or more, 2.4 wt % or more, 2.6 wt % or more, 2.8 wt % or more, 3.0 wt % or more, 3.2 wt % or more, 3.4 wt % or more, 3.6 wt % or more, 3.8 wt % or more, 4.0 wt % or more 4.2 wt % or more and even 4.4 wt % or more while at the same time contain 5.0 wt % or less and can contain 4.8 wt % or less, 4.6 wt % or less, 4.4 wt % or less, 4.2 wt % or less, 4.0 wt % or less, 3.8 wt % or less, 3.6 wt % or less, 3.4 wt % or less, 3.2 wt % or less, 3.0 wt % or less, 2.8 wt % or less, 2.6 wt % or less, 2.4 wt % or less, 2.2 wt % or less, 2.0 wt % or less, 1.8 wt % or less, and even 1.5 wt % or less based on total weight of all monomers in the polymer. The co-acid that is polymerized in addition to acrylic acid is desirably one or more acid selected from a group consisting of methacrylic acid, itaconic acid, maleic acid, fumaric acid, phosphoethyl methacrylate and phosphate esters of polyethylene glycol monomethacrylate Determine the types and amount of each monomer polymerized in the polymer by pyrolysis-gas chromatography mass spectrometry according to ASTM method ASTM D3168-85.

The polymer particles in the anionically stabilized dispersion have an average particle size of 200 nanometers (nm) or greater and can have an average size of 250 nm or greater, 300 nm or greater 350 nm or greater, 400 nm or greater, 450 nm or greater and even 500 nm or greater while at the same time is generally 600 nm or smaller, and can be 550 nm or smaller, 500 nm or smaller, 450 nm or smaller and even 400 nm or smaller Determine average particle size of the polymer particles in the anionically stabilized dispersion by 90-degree light scattering using a Malvern Zetasizer Nano ZS90.

The polymer particles in the anionically stabilized dispersion of polymer particles have an average glass transition temperature (Tg) of −55 degrees Celsius (° C.) or more and can have a of −50° C. or more, −45° C. or more, −40° C. or more, −35° C. or more, −30° C. or more, −25° C. or more, −20° C. or more, −15° C. or more, −10° C. or more, −5° C. or more 0° C. or more 5° C. or more, and even 10° C. or more while at the same time generally have a Tg of 20° C. or lower and can have a Tg of 15° C. or lower, 10° C. or lower, 5° C. or lower, 0° C. or lower, −5° C. or lower, −10° C. or lower, −15° C. or lower, −20° C. or lower, −25° C. or lower, −30° C. or lower, −35° C. or lower and even −40° C. or lower. Determine average Tg for the polymer particles by measuring the Tg of the particle according to ASTM E-1356-08.

The anionically stabilized dispersion of polymer particles desirably has a viscosity of less than 200 centipoise at a pH below 4.5 and at the same time greater than 1000 centipoise at a pH greater than 7.

The formulation comprises a polymeric polyamine. The polymeric polyamine can be derived by polymerizing one or more monomers containing an amine group or can be derived by functionalizing a polymer with multiple amine functionalities.

The polymeric polyamine can be prepared by polymerizing one or more monomers containing an amine functionality. Suitable monomers containing an amine functionality include those selected from a group consisting of vinylamine, allylamine, ethyleneimine, (meth)acrylate monomers containing one or more primary and/or secondary amine groups (such as, for example, 2-aminoethyl methacrylate, 2-aminoethyl acrylate, 2-(tert-butylamino)ethyl acrylate, 2-(tert-butylamino)ethyl methacrylate).

The polymeric polyamine can be what has been referred to as a "derivatized polyamine", which is a polymeric polyamine that is N-derivatized such that one or more primary or secondary amine nitrogens have been derivatized so as to replace one or more hydrogen atom with a non-hydrogen moiety. Derivatized polyamines are taught, for example, in US2015/0259559.

The polymeric polyamine can be a polymer of monomers that readily generate amines by hydrolysis that, after polymerization, are subjected to hydrolysis to generate amine functionalities. Examples of such monomers include acryloxy-ketimines and -aldimines, such as those of Formulas I and II following:

$$H_2C=(CR)-COOA''N=Q \qquad (I)$$

$$H_2C=C(R)-CO-(D)_{n''-1}(B)_{n'-1}-(A^o)_{n^o-1}-N=Q \qquad (II)$$

wherein

R is H or $CH_3$;

Q is selected from a group consisting of

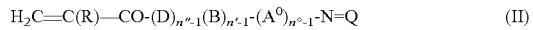

$R^6$ is H or methyl in one $CHR^6$ unit;

$R^5$ and $R^4$ are independently selected from a group consisting of $(C_1-C_{12})$-alkyl and cyclohexyl groups;

$R^3$ is selected from a group consisting of phenyl, halophenyl, $(C_1-C_{12})$-alkyl, cylcohexyl, and $(C_1-C_4)$-alkoxyphenyl groups;

A" is a $(C_1-C_{12})$ alkylene group;

$A^o$, B and D are the same or different oxyalkylene groups having the formula $-OCH(R^7)-CH(R^7)-$ where $R^7$ is H, $CH_3$, or $C_2H_5$;

x is an integer having a value of 4 or 5;

$n^o$, n' and n" are independently integers having a value in a range of 1 to 200, where the sum of $n^o$-1, n'-1 and n"-1 is a value in a range of 2 to 200.

Examples of materials of Formulas I and II are: 2-[4-(2, 6-dimethylheptylidene)-amino]ethyl methacrylate; 3-[2-(4-methylpentylidien)-amino]propyl methacrylate; 3-[2-(4-methylpentylidene)-amino]-ethyl methacrylate; 2-[4-(2,6-dimethylheptylidene)-amino]-ethyl acrylate; 12-(cyclopentylidene-amino)-dodecyl methacrylate; N-(1,3-dimethylbutylidene)-2-(2-methacryloxyethoxy)-ethylamine; N-(benzylidene)-methacryloxyethoxyethylamine; N-(1,3-dimethylbutylidene)-2-(2-acryloxyethoxy)-ethylamine; and N-(benzylidene)-2-(2-acryloxyethoxy)ethylamine.

The compounds of Formulas I and II hydrolyze in acid, neutral, or alkaline aqueous media to produce the corresponding primary amines or salts thereof in which the group $-N=Q$ of the formulae becomes $-NH_2$ and $O=Q$. The compounds of Formulae I and II are disclosed in U.S. Pat. Nos. 3,037,969 and 3,497,485 and any of the monomeric compounds therein disclosed may be used in the making copolymers suitable as the polymeric polyamine.

The polymeric polyamine can be obtained by solution polymerization in aqueous media, either neutral, alkaline, or acidic, depending upon the particular polymer sought, as generally known in the art, for example as taught in U.S. Pat. No. 4,119,600. Generally, the polymerization is carried out in an aqueous medium containing a small amount of an acid, either organic or inorganic, such as acetic acid or hydrochloric acid. The polymeric polyamine includes copolymers with up to 80% by weight of one or more monoethylenically unsaturated monomers, such as methyl acrylate, acrylamide and methacrylamide.

The polymeric polyamine is desirably one or any combination of more than one polymeric polyamine selected from a group consisting of poly-oxazolidineoethylmethacrylate, poly(N,N-dimethylaminoethyl methacrylate), poly(2-aminoethyl methacrylate), polyethyleneimine, and polymeric aminosiloxanes. Suitable aminosiloxanes include poly (aminoethyl aminopropyl siloxane). Suitable polyethyleneimines include branched polyethyleneimine.

Desirably, the polymeric polyamine has a weight average molecular weight (Mw) of 0.8 kilodaltons (kDa) or more, preferably 1.0 kDa or more, more preferably 5 kDa or more, yet more preferably 10 kDa or more and even more preferably 15 kDa or more and can be 20 kDa or more, 25 kDa or more, 30 kDa or more and even 40 kDa or more while at the same time is typically 250 kDa or less, generally 200 kDa or less, 150 kDa or less, 100 kDa or less, 50 kDa or less 25 kDa or less or even 20 kDa or less. Determine Mw of the polymeric polyamine by gel permeation chromatography.

The concentration of polymeric polyamine is desirably 0.05 wt % or more and can be 0.75 wt % or more, 0.09 wt % or more, 0.10 wt % or more, 0.15 wt % or more, 0.20 wt % or more, 0.25 wt % or more, 0.30 wt % or more, 0.35 wt % or more, 0.40 wt % or more and even 0.45 wt % or more

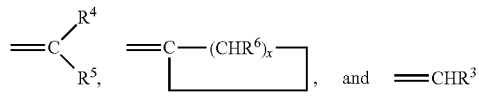

while at the same time it is generally 1.0 wt % or less, and can be 0.90 wt % or less, 0.80 wt % or less, 0.70 wt % or less, 0.60 wt % or less, 0.50 wt % or less, 0.45 wt % or less, 0.40 wt % or less, 0.35 wt % or less, 0.30 wt % or less, 0.25 wt % or less, 0.20 wt % or less, 0.15 wt % or less and even 0.10 wt % or less with wt % based on total weight of polymer in the formulation as determined by pyrolysis headspace gas chromatography.

Desirably, the polymeric polyamine contains 4.0 or more, preferably 5.0 or more, and can comprise 6.0 or more 7.0 or more, and even 8.0 or more amine functional groups per hydroxyl functional group. If the polymeric polyamine is free of hydroxyl functional groups the polymeric polyamine is considered to have an infinite number of amine functional groups per hydroxyl functional groups for the sake of this teaching (as opposed, for example, being an undefined ratio). Determine the number of amine functional groups and hydroxyl functional groups in the polymeric polyamine by nuclear magnetic resonance spectroscopy or, if the materials used to prepare the formulation are known the formulation, from calculations based on the composition of the components of the materials making up the formulation.

Desirably, the polymeric polyamine has a weight-average molecular weight (Mw) of 200 daltons (Da) or more, preferably 500 Da or more, more desirably 1000 Da or more, yet more preferably 2500 Da or more, even more preferably 5000 Da or more, yet even more preferably 10 kilodaltons (kDa) or more, 20 kDa or more, 30 kDa or more, 40 kDa or more, 50 kDa or more and even 60 kDa or more while at the same time is generally 100 kDa or less and can be 90 kDa or less, 80 kDa or less, 70 kDa or less, 60 kDa or less, 50 kDa or less, 40 kDa or less, 30 kDa or less, 20 kDa or less, 10 kDa or less, 5 kDa or less, 1000 Da or less and even 800 Da or less. Determine Mw of the polymeric polyamine by gel permeation chromatography.

The formulation includes an inorganic filler, sometimes referred to as pigment or extender. The inorganic filler is in particular form dispersed in the formulation. Suitable fillers include any one or combination of more than one selected from a group consisting of metal oxides (such as titanium oxide, zinc oxide, iron oxide), calcium carbonate, nepheline syenite, aluminosilicates, feldspar, diatomaceous earth, calcined diatomaceous earth, talc, silica, aluminum oxide, clay, kaolin, mica, pyrophyllite, perlite, barite, sodium-potassium alumina silicates and calcium metalsilicate. Desirably, the inorganic filler is one or any combination of more than one selected from a group consisting of metal oxides, calcium carbonate and sodium-potassium alumina silicates.

The concentration of inorganic filler is desirably 10 volume-percent (vol %) or more and can be 15 vol % or more, 20 vol % or more, 25 vol % or more, 30 vol % or more, 35 vol % or more, even 40 vol % or more while at the same time is typically 45 vol % or less and can be 40 vol % or less, 35 vol % or less, 30 vol % or less, 25 vol % or less and even 20 vol % or less where vol % is relative to total volume of the formulation.

Determine vol % inorganic filler relative to total volume of the formulation according to the following procedure. First, determine the density of the formulation ($d_{Form}$) according to the procedure of ASTM D1475-13. Then, determine the mass percent of the following three components of the formulation based on total formulation mass by determining their mass content according to ASTM E1131-08: (a) volatiles mass percent ($m_{vol}$); (b) polymer mass percent ($m_{pol}$); and inorganic filler mass percent ($m_{IF}$). Calculate the vol % inorganic filler relative to total volume of the formulation using the following equation:

$$Vol\ \%\ \text{inorganic filler} = $$
$$100\%\ (\text{volume inorganic filler}/\text{volume of formulation}) = $$
$$100\%\ [1 - (d_{Form})/[(d_{pol})(m_{pol})] - (d_{Form})/[(d_{vol})(m_{vol})]]$$

where $d_{pol}$ is the density of the polymer component of the formulation and is assumed to be 1.1 grams per milliliter and $d_{vol}$ is the density of the volatile components of the formulation and is assumed to be 1.0 grams per milliliter.

The formulation optionally comprises one or more than one rheology modifier. Rheology modifiers are useful to adjust the viscosity of the formulation. Desirably, the rheology modifier, if present, is a non-ionic volume exclusion thickener. Volume exclusion thickeners swell with water and take up space in the formulation. Herein, volume exclusion thickeners are considered distinct from associative thickeners. Associative thickeners increase viscosity of an aqueous formulation by water absorption and by forming three-dimensional networks through interaction of hydrophobic groups on the associative thickener molecules. Examples of suitable non-ionic volume exclusion thickeners include any one or any combination of more than one selected from a group consisting of hydroxyethyl cellulose, hydroxyethyl methyl cellulose, polyvinyl alcohol, polyvinylpyrrolidone.

Rheology modifier is present in the formulation at a concentration of zero (0) wt % or more and can be present at a concentration of 0.1 wt % or more, 0.2 wt % or more, 0.3 wt % or more, 0.4 wt % or more, 0.5 wt % or more, 0.6 wt % or more, 0.7 wt % or more, 0.8 wt % or more and even 0.9 wt % or more while at the same time is typically present at a concentration of 1.0 wt % or less, and can be 0.9 wt % or less, 0.8 wt % or less, 0.7 wt % or less, 0.6 wt % or less, 0.5 wt % or less, 0.4 wt % or less, 0.3 wt % or less, 0.2 wt % or less and even 0.1 wt % or less relative to total formulation weight. Preferably, determine wt % rheology modifier from the formulation composition from the amount of components added to a formulation. From a formulation without knowing the amount of components added to the formulation, separate and quantify the rheology modifier by gel permeation chromatography and high pressure liquid chromatography to determine its wt % of the total formulation.

The formulation has a viscosity that is greater than 15,000 centipoise. At the same time the formulation desirably has a viscosity of 1,000,000 centipoise or less and can have a viscosity of 750,000 centpoise or less, 500,000 centipoise or less, 250,000 centipoise or less, 100,000 centipoise or less, 75,000 centipoise or les, 50,000 centipoise or less, 40,000 centipoise or less, 30,000 centipoise or less and even 20,000 centipoise or less. As mentioned in the Background Section, above, it is one hypothesis that the high viscosity of the formulation is one factor contributing the achieving both storage stability and quick set characteristics of the formulation. Viscosity is adjustable by selecting the concentration and type of inorganic filler, the type and concentration of polymer particles in the anionically stabilized dispersion of polymer particles, the pH of the formulation and the concentration of rheology modifier in the formulation. One of ordinary skill can modify these factors to achieve desirable properties in performance as well as formulation viscosity.

The total solids of the formulation is 60 vol % or more, and can be 62 vol % or more, 65 vol % or more, 66 vol % or more, even 68 vol % or more and at the same time is generally 70 vol % or less and can be 69 vol % or less, 68 vol % or less, 67 vol % or less, 66 vol % or less, even 65 vol % or less relative to total formulation volume as determined according to ASTM method D5201-05a.

The formulation has a pH that is 6.0 or higher and can be 6.2 or higher, 6.4 or higher, 6.6 or higher, 6.8 or higher, 7.0 or higher, 7.2 or higher, 7.4 or higher, 7.6 or higher, 7.8 or higher, 8.0 or higher and even 8.2 or higher while at the same time is generally 8.5 or lower and can be 8.4 or lower, 8.2 or lower, 8.0 or lower, 7.8 or lower, 7.6 or lower, 7.5 or lower, 7.4 or lower, 7.2 or lower, 7.0 or lower, 6.8 or lower, 6.6 or lower, and even 6.4 or lower. Determine pH according to ASTM E-70. One of ordinary skill in the art can adjust the pH of the present formulation through, for example, selection of acids and acid concentrations in the polymer of the anionically stabilized dispersion, the types and amounts of inorganic fillers, as well as the amount of polymeric polyamine used in the formulation.

The anionically stabilized dispersion of polymer particles, and desirably the formulation, is free of aminosilanes. The anionically stabilized dispersion of polymer particles, and even the formulation, can be free of silicon-containing materials altogether.

The formulation is free of quaternary poly(allylamine) and can be free of polyimine.

Moreover, the formulation is free of volatile base, particularly ammonia. Presence of volatile base is determined by head space gas chromatography according ASTM D4526-12. Notably, "free of volatile base" allows for the presence of volatile base impurities that may be present and refers to intentionally added volatile base. In that regard, "free of volatile base" refers to containing 500 weight parts per million weight parts (ppm) volatile base or less, preferably 250 ppm volatile base or less, more preferably 100 ppm volatile base or less and can be 50 ppm volatile base or less and even 10 ppm volatile base or less or 0 ppm volatile base or less. The concentrations of volatile base are relative to total formulation weight.

Volatile bases are commonly used in similar formulations as triggering agents by stabilizing the formulation from setting up while stored but evaporating and allowing for the formulation to set up once applied as a coating. Surprisingly, the formulation of the present invention does not need the volatile base trigger. Volatile bases are substances that are soluble in water but evaporate from an aqueous solution under suitable drying conditions for an aqueous coating (for example 23° C. at 50% relative humidity). A volatile base typically has a vapor pressure at 20° C. of at least 0.2 millimeters mercury. Perhaps the most commonly used volatile base is ammonia. Other examples of volatile bases include morpholine, 2-dimethylaminoethanol, N-methylmorpholine, ethylenediamine, ethanolamine, 2-amino-2-methyl-1-propanol, aminopropanol, diethylamine and dimethylamine.

Despite being free of volatile base, the single formulation of the present invention surprisingly demonstrates both storage stability and rapid setting properties. Determine whether a formulation has "storage stability" according to the Heat Age Stability Test set forth below. Determine whether a formulation demonstrates "rapid setting properties" according to the Washout Resistance Test set forth below.

Heat Age Stability Test

Provide a sample formulation at 22° C. in a 118 milliliter (¼-pint) cup until the cup is approximately 90% full. Measure the viscosity of the formulation. Seal the formulation into the cup and place in an oven at 60° C. (140° Fahrenheit) for 240 hours. Remove the container from the oven and allow it to cool to 22° C. over 24 hours. Stir the formulation with a spatula. A sample formulation is deemed to have "storage stability" if it remains mixable by hand.

Washout Resistance Test

Provide a test panel of THERMAX™ brand insulation (THERMAX is a trademark of The Dow Chemical Company). Apply a film of a sample formulation to the surface of the test panel using a trowel over a 1.5 millimeter (60 mil) mask. Remove excess sample formulation by scraping with a straight edge. Remove the mask to leave a 1.5 millimeter (60 mil) thick film of the formulation on the surface of the test panel. The resulting film has a width of 8.26 centimeters (3.25 inches) and a length of 31.75 centimeters (12.5 inches). Dry the film for 4 hours at 23° C. (73° F.) and 50% relative humidity. Place the panel with the dry film in approximately a vertical position in a sink with a washout apparatus mounted so as to spray a fan of water horizontally across the surface of the dried film of formulation approximately midway between the top edge and center of the dried film. The washout apparatus is a rectangular garden hose nozzle with a 2.54 centimeter (one inch) by 15.2 centimeter (6 inch) face that sprays water onto the test panels at a rate of 11.4 liters (3 gallons) per minute. Spray water across the dried film at a rate of three gallons per minute until either the film washed off the test panel or a period of 2 hours, whichever occurs first. The sample formulation is deemed to have "rapid setting properties" if after the 2 hours of water spray there is no evidence of deterioration such as washout, visual surface erosion or blister formation.

EXAMPLES

Presented first is a description of the anionically stabilized dispersions used in the Examples (Exs) and Comparative Examples (Comp Exs). Presented second is a description of the formulations of the Exs and Comp Exs and their performance with respect to the Heat Age Stability Test and Washout Resistance Test.

Preparation of Anionically Stabilized Dispersions

Table 1 lists a summary of the anionically stabilized dispersions (ASD) for use in the Exs and Comp Exs. The table identifies the ASD by a letter, indicates if it is in scope of the claimed invention (Ex) or outside the scope of the claimed invention (Comp Ex) and further describes the ASD. ASD compositions are reported with wt % of each monomer component, average particle size in nanometers (nm), Tg of the polymer particles, and wt % solids for the ASD. For the description of monomers the following abbreviations are used: butyl acrylate (BA), methyl methacrylate (MMA), hydroxymethylmethacrylate (HEMA), methacrylic acid (MAA), acrylic acid (AA), and phosphoethyl methacrylate (PEM).

Following Table 1 is a description of how to prepare each of the anionically stabilized dispersions.

TABLE 1

| ASD | Ex/Comp Ex | Description/Comments |
|---|---|---|
| A | Ex | 94.05 BA/2.00 MMA/1.95 HEMA/0.5 MAA/1.5 AA<br>307 nm; −43° C. Tg; 4.6 pH; 63.3 wt % solids |
| B | Comp Ex | Dispersion A without MAA<br>94.05 BA/2.50 MMA/1.95 HEMA/1.5 AA<br>333 nm; −43° C. Tg; 4.5 pH; 63.4 wt % solids |
| C | Ex | Dispersion A with ¼ the MAA<br>94.05 BA/2.38 MMA/1.95 HEMA/0.13 MAA/1.5 AA<br>308 nm; −43° C. Tg; 4.5 pH; 63.4 wt % solids |

TABLE 1-continued

| ASD | Ex/Comp Ex | Description/Comments |
|---|---|---|
| D | Ex | Dispersion A without ½ the MAA<br>94.05 BA/2.25 MMA/1.95 HEMA/0.25 MAA/1.5 AA<br>317 nm; −43° C. Tg; 4.5 pH; 63.4 wt % solids |
| E | Ex | Dispersion A with Itaconic Acid instead of MAA<br>94.1 BA/2.2 MMA/1.95 HEMA/0.3 IA/1.5 AA<br>288 nm; −44° C. Tg; 4.6 pH; 63.5 wt % solids |
| F | Ex | Dispersion A with Phosphoethyl methacrylate instead of MAA<br>94.1 BA/2.1 MMA/1.9 HEMA/0.4 PEM /1.5 AA<br>259 nm; −44° C. Tg; 4.5 pH; 63.3 wt % solids |
| G | Comp Ex | Dispersion A without AA<br>94.05 BA/3.50 MMA/1.95 HEMA/0.5 MAA<br>324 nm; −42° C. Tg; 4.5 pH; 63.2 wt % solids |
| H | Comp Ex | Dispersion A with ⅓ the AA<br>94.05 BA/3.00 MMA/1.95 HEMA/0.5 MAA/0.5 AA<br>281 nm; −42° C. Tg; 4.5 pH; 63.3 wt % solids |
| I | Ex | Dispersion A with ⅔ the AA<br>94.05 BA/2.50 MMA/1.95 HEMA/0.5 MAA/1.0 AA<br>231 nm; −43° C. Tg; 4.5 pH; 63.2 wt % solids |
| J | Ex | Dispersion A with Higher Tg Composition<br>81.05 BA/15.0 MMA/1.95 HEMA/0.5 MAA/1.5 AA<br>237 nm; −29° C. Tg; 4.6 pH; 63.2 wt % solids |
| K | Ex | Dispersion A without HEMA<br>94.05 BA/3.95 MMA/0.5 MAA/1.5 AA<br>301 nm; −43° C. Tg; 4.3 pH; 63.5 wt % solids |
| L | Comp Ex | Dispersion A with Lower Solids<br>94.05 BA/2.00 MMA/1.95 HEMA/0.5 MAA/1.5 AA<br>285 nm; −43° C. Tg; 4.5 pH; solids is 57.6.5 wt % |

Anionically Stabilized Dispersion A

Prepare anionically stabilized dispersion A by emulsion polymerization in a four neck five-liter round bottom reaction flask equipped with a condenser, a mechanical stirrer, a thermocouple, a monomer feed line an initiator feed line and a nitrogen inlet.

Prepare a monomer emulsion in a second vessel separate from the reaction flask by mixing 469.7 grams (g) of deionized water and 29.4 g of a 23.0% solution of sodium dodecylbenzenesulfonate in water followed by adding 2074.4 g butyl acrylate, followed by 44.1 g methyl methacrylate, 43.0 g hydroxyethyl methacrylate, 11.0 g methacrylic acid and 33.1 g acrylic acid.

Into a third vessel prepare an initiator co-feed solution by dissolving 2.7 g sodium persulfate into 98.1 g deionized water.

To the reaction flask add 412.8 g deionized water and heat to 90° C. under nitrogen sweep while stirring. Add a solution containing 6.3 g sodium persulfate dissolved in 17.6 g water followed by a 3.9 g deionized water rinse. Add 34.8 g of a 44 wt % solids 100 nanometer acrylic polymer seed emulsion followed by a 15.7 g deionized water rinse.

Feed the initiator co-feed solution to the reaction flask at a rate of 1.1 g per minute. Set the temperature for the reaction flask to 85.0° C. and feed the monomer emulsion into the reaction flask at a rate of 16.5 g per minute. After 15 minutes increase the monomer emulsion feed rate to 32.9 g per minute.

38 minutes after starting the monomer emulsion feed, add 53.8 g of a 41 wt % solids 62 nanometer acrylic polymer seed emulsion to the reaction flask followed by 15.7 g of deionized water rinse.

65 minutes after starting the monomer emulsion feed, add 1.1 g of n-dodecyl mercaptan and 7.9 g of deionized water to the monomer emulsion.

After complete monomer emulsion and initiator co-feed addition, hold the reaction flask temperature at 85° C. for 15 minutes during which time add a solution of 3.0 g sodium carbonate in 70 g deionized water at a rate of 5.0 grams per minute, 5.7 g of 0.15 wt % solution of ferrous sulfate in water and 3.7 g rinse of deionized water. Cool the reaction flask to 75° C. Chase residual monomers by addition of 4.1 g of a 70% solution of tert-butylhydroperoxide in water dissolved in 11.8 g of deionized water and a solution of 2.7 g reducing agent (Bruggolite™ FF6 M; Bruggolite is a trademark of Brugemann, KG) in 49.3 g of deionized water by feeding evening over 30 minutes. Cool the resulting dispersion to room temperature (approximately 22° C.).

The resulting dispersion has a solids content of 63.5 wt %, and average particle size of 307 nanometers, a Tg of −43° C. and a pH of 4.5. The composition of the polymer particles in the dispersion is 94.05 wt % butyl acrylate, 2.00 wt % methyl methacrylate, 1.95 wt % hydroxyethyl methacrylate, 0.5 wt % methacrylic acid and 1.5 wt % acrylic acid.

Anionically Stabilized Dispersion B—No Co-Acid

Anionically Stabilized Dispersion B is similar to Anionically Stabilized Dispersion A except it lacks the co-acid component (acid other than acrylic acid).

Prepare in like manner as Anionically Stabilized Dispersion A except replace the 11.0 g methacrylic acid with 11.0 g of methyl methacrylate. The level of sodium carbonate neutralizer is also reduced to 2.3 g. The final anionically stabilized dispersion polymer particles have a polymer composition of 94.05 wt % butyl acrylate, 2.50 wt % methyl methacrylate, 1.95 wt % hydroxyethyl methacrylate and 1.5 wt % acrylic acid.

Anionically Stabilized Dispersion C—¼ Methacrylic Acid

Anionically Stabilized Dispersion C is similar to Anionically Stabilized Dispersion A except it contains one quarter as much co-acid component (acid other than acrylic acid). Three quarters of the methacrylic acid is replaced with methyl methacrylate.

Prepare in like manner as Anionically Stabilized Dispersion A except replace the 8.3 g of the methacrylic acid with 8.3 g of methyl methacrylate. The level of sodium carbonate neutralizer is also reduced to 2.5 g. The final anionically stabilized dispersion polymer particles have a polymer composition of 94.05 wt % butyl acrylate, 2.38 wt % methyl methacrylate, 1.95 wt % hydroxyethyl methacrylate, 0.13 wt % methacrylic acid and 1.5 wt % acrylic acid.

Anionically Stabilized Dispersion D—½ Methacrylic Acid

Anionically Stabilized Dispersion D is similar to Anionically Stabilized Dispersion A except it contains half as much co-acid component (acid other than acrylic acid). Half of the methacrylic acid is replaced with methyl methacrylate.

Prepare in like manner as Anionically Stabilized Dispersion A except replace the 5.5 g of the methacrylic acid with 5.5 g of methyl methacrylate. The level of sodium carbonate neutralizer is also reduced to 2.7 g. The final anionically stabilized dispersion polymer particles have a polymer composition of 94.05 wt % butyl acrylate, 2.25 wt % methyl methacrylate, 1.95 wt % hydroxyethyl methacrylate, 0.25 wt % methacrylic acid and 1.5 wt % acrylic acid.

Anionically Stabilized Dispersion E—Itaconic Acid Co-Acid

Anionically Stabilized Dispersion E is similar to Anionically Stabilized Dispersion A except it contains a different co-acid component (acid other than acrylic acid). The methacrylic acid is replaced with itaconic acid.

Prepare in like manner as Anionically Stabilized Dispersion A except replace the 11.0 g of the methacrylic acid with 7.0 g of itaconic acid. The final anionically stabilized dispersion polymer particles have a polymer composition of 94.1 wt % butyl acrylate, 2.2 wt % methyl methacrylate, 1.95 wt % hydroxyethyl methacrylate, 0.3 wt % itaconic acid and 1.5 wt % acrylic acid.

Anionically Stabilized Dispersion F—Phosphoethyl Methacrylate

Anionically Stabilized Dispersion F is similar to Anionically Stabilized Dispersion A except it contains a different co-acid component (acid other than acrylic acid). All of the methacrylic acid is replaced with phosphoethyl methacrylate.

Prepare in like manner as Anionically Stabilized Dispersion A except replace the 11.0 g of the methacrylic acid with 7.8 g of phosphoethyl methacrylate active, which was delivered as a 60 wt % admixture with MMA and HEMA. The level of sodium carbonate neutralizer is also increased to 3.7 g. The final anionically stabilized dispersion polymer particles have a polymer composition of 94.1 wt % butyl acrylate, 2.1 wt % methyl methacrylate, 1.9 wt % hydroxyethyl methacrylate, 0.4 wt % phosphoethyl methacrylate and 1.5 wt % acrylic acid.

Anionically Stabilized Dispersion G—No Acrylic Acid

Anionically Stabilized Dispersion G is similar to Anionically Stabilized Dispersion A except it does not contain acrylic acid. The acrylic acid is replace with methyl methacrylate.

Prepare in like manner as Anionically Stabilized Dispersion A except replace the 33.1 g of the acrylic acid with 33.1 g of methyl methacrylate. The level of sodium carbonate neutralizer is also reduced to 0.6 g. The final anionically stabilized dispersion polymer particles have a polymer composition of 94.05 wt % butyl acrylate, 3.50 wt % methyl methacrylate, 1.95 wt % hydroxyethyl methacrylate, 0.5 wt % methacrylic acid.

Anionically Stabilized Dispersion H—⅓ Acrylic Acid

Anionically Stabilized Dispersion H is similar to Anionically Stabilized Dispersion A except it has a reduced amount of acrylic acid. Part of the acrylic acid is replace with methyl methacrylate.

Prepare in like manner as Anionically Stabilized Dispersion A except replace 22.1 g of the acrylic acid with 22.1 g of methyl methacrylate. The level of sodium carbonate neutralizer is also reduced to 1.25 g. The final anionically stabilized dispersion polymer particles have a polymer composition of 94.05 wt % butyl acrylate, 3.00 wt % methyl methacrylate, 1.95 wt % hydroxyethyl methacrylate, 0.5 wt % methacrylic acid and 0.5 wt % acrylic acid.

Anionically Stabilized Dispersion I—⅔ Acrylic Acid

Anionically Stabilized Dispersion I is similar to Anionically Stabilized Dispersion A except it has a reduced amount of acrylic acid. Part of the acrylic acid is replace with methyl methacrylate.

Prepare in like manner as Anionically Stabilized Dispersion A except replace 11.1 g of the acrylic acid with 11.1 g of methyl methacrylate. The level of sodium carbonate neutralizer is also reduced to 1.9 g. The final anionically stabilized dispersion polymer particles have a polymer composition of 94.05 wt % butyl acrylate, 3.00 wt % methyl methacrylate, 1.95 wt % hydroxyethyl methacrylate, 0.5 wt % methacrylic acid and 1.0 wt % acrylic acid.

Anionically Stabilized Dispersion J—Higher Tg

Anionically Stabilized Dispersion J is similar to Anionically Stabilized Dispersion A except it has a higher Tg as a result of replacing a portion of the butyl acrylate with an equal weight of methyl methacrylate.

Prepare in like manner as Anionically Stabilized Dispersion A except replace 286.7 g of the butyl acrylate with 286.7 g of methyl methacrylate. The final anionically stabilized dispersion polymer particles have a polymer composition of 81.05 wt % butyl acrylate, 15.0 wt % methyl methacrylate, 1.95 wt % hydroxyethyl methacrylate, 0.5 wt % methacrylic acid and 1.5 wt % acrylic acid.

Anionically Stabilized Dispersion K—No Hydroxyethyl Methacrylate

Anionically Stabilized Dispersion K is similar to Anionically Stabilized Dispersion A except the hydroxyethyl methacrylate was replaced with an equal weight of additional methyl methacrylate.

Prepare in like manner as Anionically Stabilized Dispersion A except replace 43.0 g of the hydroxyethyl methacrylate with 43.0 g of methyl methacrylate. The final anionically stabilized dispersion polymer particles have a polymer composition of 94.05 wt % butyl acrylate, 3.95 wt % methyl methacrylate, 0.0 wt % hydroxyethyl methacrylate, 0.5 wt % methacrylic acid and 1.5 wt % acrylic acid.

Anionically Stabilized Dispersion L—Reduced Solids

Anionically Stabilized Dispersion L is similar to Anionically Stabilized Dispersion A except final solids are 57.6% and average particle size is 285 nm.

Prepare in like manner as Anionically Stabilized Dispersion A except add 372.7 g deionized water to the reaction flask after the polymerization.

Polymeric Polyamines for Use in Formulations

Table 2 identifies the polymeric polyamines used in preparing the formulations of the Examples (Exs) and Comparative Examples (Comp Exs).

TABLE 2

| Identifier | Description |
|---|---|
| PPA1 | Poly(oxazolidinoethyl methacrylate), 40 kDa |
| PPA2 | Branched polyethyleneimine, 800 Da |
| PPA3 | Branched polyethyleneimine, 18 kDa |
| PPA4 | Poly(N,N-dimethylaminoethyl methacrylate), 68 kDa |
| PPA5 | Poly(aminoethyl aminopropyl siloxane), 5.2 kDa |
| PPA6 | Poly(2-aminoethyl methacrylate), 81 kDa |

Prepare the polymeric polyamines as follows.

PPA1—Fit a one-liter, four neck round bottom flask (reactor flask) with a condenser, mechanical stirrer, thermocouple and monomer feed line, initiator feed line and a nitrogen inlet. Add 100.0 g deionized water followed by 1.0 g glacial acetic acid, 1.5 g of a 0.15 wt % aqueous ferrous sulfate solution and 0.9 g of a 1.5 wt % aqueous tetrasodium ethylenediaminetetraacetate tetrahydrate (for example, VERSENE™ 220 chelating agent; VERSENE is a trademark of The Dow Chemical Company). Heat the contents of the reactor flask to 30° C. under a nitrogen sweep while stirring. Prepare in a second vessel a monomer mix by dissolving 112.0 g of oxazolidinylethyl methacrylate in 112.0 g of deionized water. Prepare in a third vessel a catalyst co-feed by dissolving 2.0 g of a 30 wt % aqueous solution of hydrogen peroxide hydroperoxide in 15.0 g of deionized water. In a fourth vessel prepare an activator co-feed by dissolving 1.1 g of sodium hydromethanesulfinate hydrate in 15.0 g of deionized water. Feed the monomer mix evenly to the reaction flask at a rate of 3.8 g per minute. Concurrent with the monomer mix, feed the catalyst co-feed and activator co-feed into the reaction flask at a rate of 0.28 g per minute. Initiate the feeds at 30° C. and maintain the reaction flask temperature at 40° C. during the feed. Upon completion of the monomer mix feed, add 20.0 milliliter (mL) rinse of deionized water to the reactor flask and chase residual monomers by evenly feeding solutions of 0.2 g of 70 wt % aqueous solution of tert-butyl hydroperoxide in 2.0 g deionized water and 0.1 g sodium hydromethanesulfinate hydrate in 2.5 g of deionized water. The solids of the resulting solution is 29 wt %.

PPA2—Prepare as a 28 wt % aqueous solution of branched polyethyleneimine, 800 Da (available from Sigma Aldrich) by diluting the polyethyleneimine into water.

PPA3—Prepare as a 28 wt % aqueous solution of branched polyethyleneimine, 18 kDa (available from Sigma Aldrich) by diluting the polyethyleneimine into water PPA4—Fit a one-liter four neck round bottom reaction flask with a condenser, mechanical stirrer, thermocouple, monomer feed line, an initiator feed line and a nitrogen inlet. Add 360.0 g of deionized water to the reaction flask followed by 1.0 g of 0.15 wt % aqueous ferrous sulfate solution and 0.5 g of 1.5 wt % aqueous solution of tetrasodium ethylenediamines tetraacetate tetrahydrate (for example VERSENE 220 chelating agent). Heat the contents of the reactor flask to 60° C. under nitrogen sweep while stirring. In a second vessel prepare a catalyst co-feed by dissolving 1.0 g of a 70 wt % aqueous solution of tert-butyl hydroperoxide in 10.0 g of deionized water. In a third vessel prepare an activator co-feed by dissolving 1.0 g of sodium hydroxymethanesulfinate hydrate in 10.0 g of deionized water. Feed 150.0 g of dimethylaminoethyl methacrylate evenly to the reaction flask at a rate of 1.5 grams per minute while concurrently feeding the catalyst co-feed and activator co-feed at a rate of 0.09 grams per minute. During the feeds maintain the reaction flask at 60° C. Once feeds are complete cool the reaction flask to room temperature (approximately 23° C.). The resulting solids is 28 wt %.

PPA5—Fit a four neck, round bottom reaction flask with a magnetic stirrer. Add 55.0 g aminoethyl aminopropyl trimethoxysilane to the reaction flask. Add 50.0 g of deionized water to a 100 mL addition funnel and equip the funnel to the reaction flask. Add the water to the reaction flask over one hour while mixing the contents of the reaction flask. Cap the reaction flask and mix for an addition hour. Strip volatiles from the reaction flask and concentration the solution using a rotary evaporator under reduced pressure. Final solids of the solution is 48 wt %.

PPA6—Fit a one-liter four neck round bottom reaction flask with a condenser, mechanical stirrer, thermocouple, monomer feed line, initiator feed line and a nitrogen inlet. Add 100.0 g of deionized water to the reaction flask followed by 1.0 g of glacial acetic acid, 1.5 g of 0.15 wt % aqueous ferrous sulfate solution and 0.9 g of 1.5 wt % aqueous tetrasodium ethylenediaminetetraacetate tetrahydrate solution. Heat the contents of the reaction flask to 45° C. under nitrogen sweep while stirring. In a second vessel prepare a monomer mix by dissolving 112.0 g of 2-aminoethyl methacrylate in 112.0 g of deionized water. In a third vessel prepare a catalyst co-feed by dissolving 1.9 g of a 70 wt % aqueous solution of tert-butyl hydroperoxide in 15.0 g of deionized water. In a fourth vessel prepare an activator co-feed by dissolving 1.1 g of sodium hydroxymethanesulfinate hydrate in 15.0 g of deionized water. Feed the monomer mix to the reaction flask at a rate of 1.9 g per minute while concurrently feeding the catalyst co-feed and activator co-feed at a rate of 0.14 g per minute. Maintain the temperature at 45° C. during the feeds. Upon completing the monomer mix feed, add 20.0 mL rinse of deionized water to the reactor and chase residual monomer by evenly feeding solutions of 0.2 g of 70 wt % aqueous solution of tert-butyl hydroperoxide in 2.0 g deionized water and 0.1 g of sodium hydroxymethanesulfinate hydrate in 2.5 g of deionized water. The solids of the solution is 29 wt %.

Example and Comparative Example Formulations

Effect of Polymeric Polyamines

Examples 1-6 demonstrate the efficacy of PPA1-PPA6 as the polymeric polyamine in formulations of the present invention. Comparative Example A illustrates that lack of a polymeric polyamine in a similar formulation fails to achieve the desired rapid setting properties; hence, the polymeric polyamine is a necessary component of the present invention.

Example 1

Sequentially add into a container 114.8 g of Anionically Stabilized Dispersion (ASD) A, 0.6 g of a hydrocarbon/nonionic surfactant defoamer (Foamaster™ NXZ; Foamaster is a trademark of Cognis IP Management GmbH), 2.8 g titanium dioxide pigment (for example Ti-Pure™ R-706, Ti-Pure is a trademark of The Chemours Company, TT, LLC), and 3.0 g polyacid pigment dispersant that is 30% solids and free of ammonia and formaldehyde (for example, TAMOL™ 851 dispersant; TAMOL is a trademark of Rohm and Haas Company). Mix the components together using a Cowels dispersing blade operating at 2000 revolutions per minute for ten minutes. Transfer the mixture to a Hobart mixer capable of being operated under vacuum. In a separate container prepare a rheology modifier premixture by combining 4.1 g of propylene glycol with 0.4 g high molecular weight hydroxyethyl cellulose thickener CAS #9004-62-0 (for example CELLOSIZE™ QP-100MH, CELLOSIZE is a trademark of Union Carbide Corporation). Add the rheology modifier premixture to the mixture in the Hobart mixer. Mix the components in the Hobart mixer together using a flat "B" style beater for ten minutes or until the contents are uniformly thickened. Add 74.1 g calcium carbonate filler having a mean particle size of 7 micrometer (for example Drikalite™ ground marble; Drikalite is a trademark of Imerys Pigments, Inc) and mix for another ten minutes. Add 0.25 g of PPA1 and mix for ten minutes while drawing a vacuum to 25 millimeters of mercury for 20 minutes to produce the final formulation of Example 1. The resulting formulation has a solids content of 74.4 wt % and 66.5 vol %, pH of 7.2, wet density of 1.4 grams per milliliter and a viscosity of 185,000 centipoise. The formulation is free of volatile amine and quaternary poly(allylamine) and contains 0.10 wt % polymeric polyamine based on total weight of polymer in the formulation and 28 vol % inorganic filler. Example 1 has storage stability and rapid setting properties according to the Heat Age Stability Test and Washout Resistance Test.

Example 2

Prepare Example 2 in like manner as Example 1 except replace 0.25 g of PPA1 with 0.5 g of PPA2. The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.19 wt % polymeric polyamine based on total weight of polymer in the formulation and 28 vol % inorganic filler.

Example 2 has storage stability and rapid setting properties according to the Heat Age Stability Test and Washout Resistance Test

Example 3

Prepare Example 3 in like manner as Example 1 except replace 0.25 g of PPA1 with 0.6 g of PPA3. The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.23 wt % polymeric polyamine based on total weight of polymer in the formulation and 28 vol % inorganic filler. Example 3 has storage stability and rapid setting properties according to the Heat Age Stability Test and Washout Resistance Test.

Example 4

Prepare Example 4 in like manner as Example 1 except replace 0.25 g of PPA1 with 0.32 g of PPA4. The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.13 wt % polymeric polyamine based on total weight of polymer in the formulation and 28 vol % inorganic filler. Example 4 has storage stability and rapid setting properties according to the Heat Age Stability Test and Washout Resistance Test.

Example 5

Prepare Example 5 in like manner as Example 1 except replace 0.25 g of PPA1 with 0.33 g of PPA5. The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.22 wt % polymeric polyamine based on total weight of polymer in the formulation and 28 vol % inorganic filler. Example 5 has storage stability and rapid setting properties according to the Heat Age Stability Test and Washout Resistance Test.

Example 6

Prepare Example 6 in like manner as Example 1 except replace 0.25 g of PPA1 with 0.78 g of PPA6. The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.31 wt % polymeric polyamine based on total weight of polymer in the formulation and 28 vol % inorganic filler. Example 6 has storage stability and rapid setting properties according to the Heat Age Stability Test and Washout Resistance Test.

Comparative Example A

Prepare Comparative Example A in like manner as Example 1 except do not include any PPA1. The resulting formulation has a solids content of 74 wt % and 66 vol %, pH of 7.2, wet density of 1.4 grams per milliliter and a viscosity of 150,000 centipoise. The formulation is free of volatile amine and quaternary poly(allylamine) and contains 0.00 wt % polymeric polyamine based on total weight of polymer in the formulation and 28 vol % inorganic filler. Example 5 does not demonstration rapid setting properties according to the Washout Resistance Test.

Effect of Additional Added Base

Example 7 illustrates that addition of non-volatile base (NaOH solution) to a pH of 7.9 still achieves storage stability and rapid setting properties. Hence, non-volatile base can be included in formulations of the present invention. Comparative Examples B and C illustrate that addition of volatile base (ammonium hydroxide) to a pH of 9-10 results in a formulation that does not demonstrate rapid setting properties even though they have a higher viscosity.

Example 7

Prepare Example 7 in like manner as Example 1 except add 0.4 g of a 5 wt % solution of sodium hydroxide in the component mixture mixer just prior to adding the calcium carbonate. The resulting formulation has a solids content of 74 wt % and 66 vol %, pH of 7.9, wet density of 1.4 grams per milliliter and a viscosity of 185,000 centipoise. The formulation is free of volatile amine and quaternary poly(allylamine) and contains 0.10 wt % polymeric polyamine based on total weight of polymer in the formulation and 28 vol % inorganic filler. Example 7 has storage stability and rapid setting properties according to the Heat Age Stability Test and Washout Resistance Test.

Comparative Example B

Prepare Comparative Example B in like manner as Example 7 except add 0.7 g of a 28 wt % solution of ammonium hydroxide instead of 0.4 g of a 5 wt % solution of sodium hydroxide to the component mixture mixer just prior to adding the calcium carbonate. The resulting formulation has a solids content of 74 wt % and 66 vol %, pH of 9.0, wet density of 1.4 grams per milliliter and a viscosity of 200,000 centipoise. The formulation is free of volatile amine and quaternary poly(allylamine) and contains 0.10 wt % polymeric polyamine based on total weight of polymer in the formulation and 28 vol % inorganic filler. Comparative Example B does not have rapid setting properties according to the Washout Resistance Test.

Comparative Example C

Prepare Comparative Example C in like manner as Example 7 except add 2.1 g of a 28 wt % solution of ammonium hydroxide instead of 0.4 g of a 5 wt % solution of sodium hydroxide to the component mixture mixer just prior to adding the calcium carbonate. The resulting formulation has a solids content of 74 wt % and 66 vol %, pH of 10.0, wet density of 1.4 grams per milliliter and a viscosity of 250,000 centipoise. The formulation is free of volatile amine and quaternary poly(allylamine) and contains 0.10 wt % polymeric polyamine based on total weight of polymer in the formulation and 28 vol % inorganic filler. Comparative Example B does not have rapid setting properties according to the Washout Resistance Test.

Effect of Different Amounts of Inorganic Filler

Examples 8 and 9 illustrates that concentration of inorganic filler can be lower (18 vol %) or higher (40 vol %) than that of Example 1 (28 vol %) while still achieving storage stability and rapid setting properties. The amount of PPA1 was inversely changed with respect to amount of inorganic filler to compensate for rapid setting property performance.

Example 8

Prepare Example 8 in like manner as Example 1 except: (a) use 125.6 g PPA1; (b) reduce the amount of titanium dioxide pigment from 2.8 g to 1.7 g; and (c) reduce calcium carbonate filler from 74.1 g to 45.7 g. The resulting formulation has a solids content of 70 wt % and 64 vol %, pH of 7.2, wet density of 1.4 grams per milliliter and a viscosity of 90,000 centipoise. The formulation is free of volatile amine and quaternary poly(allylamine) and contains 0.09 wt % polymeric polyamine based on total weight of polymer in the formulation and 18 vol % inorganic filler. Example 8 has storage stability and rapid setting properties according to the Heat Age Stability Test and Washout Resistance Test.

Example 9

Prepare Example 9 in like manner as Example 1 except: (a) use 95.7 g PPA1 and 7.1 g of additional water instead of 114.8 g of PPA1; (b) increase the amount of titanium dioxide pigment from 2.8 g to 4.0 g; and (c) increase the amount of calcium carbonate filler from 74.1 g to 105.8 g. The resulting formulation has a solids content of 77 wt % and 67 vol %, pH of 7.2, wet density of 1.4 grams per milliliter and a viscosity of 370,000 centipoise. The formulation is free of volatile amine and quaternary poly(allylamine) and contains 0.12 wt % polymeric polyamine based on total weight of polymer in the formulation and 40 vol % inorganic filler. Example 9 has storage stability and rapid setting properties according to the Heat Age Stability Test and Washout Resistance Test.

Effect of Different Types of Inorganic Filler

Examples 10 and 11 illustrate that different types of inorganic filler can be included in the formulations of the present invention.

Example 10

Prepare Example 10 in like manner as Example 1 except the calcium carbonate is replaced with the same weight of sodium-potassium alumina silicate (MINEX™ 10 from Unimin Corporation; MINEX is a trademark of Unimin Canada Ltd). The resulting formulation has a solids content of 74 wt % and 66 vol %, pH of 7.0, wet density of 1.4 grams per milliliter and a viscosity of 185,000 centipoise. The formulation is free of volatile amine and quaternary poly (allylamine) and contains 0.10 wt % polymeric polyamine based on total weight of polymer in the formulation and 28 vol % inorganic filler. Example 10 has storage stability and rapid setting properties according to the Heat Age Stability Test and Washout Resistance Test.

Example 11

Prepare Example 11 in like manner as Example 1 except the calcium carbonate is replaced with the same weight of alumina trihydrate. The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.10 wt % polymeric polyamine based on total weight of polymer in the formulation and 28 vol % inorganic filler. Example 11 has storage stability and rapid setting properties according to the Heat Age Stability Test and Washout Resistance Test.

Effect of Weight-Percent Solids

Examples 12-14 illustrate that decreasing wt % solids can still produce a formulation with storage stability and rapid setting properties even with a lower viscosity. Additional polymeric polyamine is used to in these Examples to achieve rapid setting properties.

Example 12

Prepare Example 12 in like manner as Example 1 except add an additional 10.0 g of deionized water with ASD-A and increase the amount of PPA1 to 2.0 g. The resulting formulation has a solids content of 71 wt % and 62 vol %, pH of 7.2, wet density of 1.4 grams per milliliter and a viscosity of 125,000 centipoise. The formulation is free of volatile amine and quaternary poly(allylamine) and contains 0.80 wt % polymeric polyamine based on total weight of polymer in the formulation and 28 vol % inorganic filler. Example 12 has storage stability and rapid setting properties according to the Heat Age Stability Test and Washout Resistance Test.

Example 13

Prepare Example 13 in like manner as Example 1 except add an additional 20.0 g of deionized water with ASD-A and increase the amount of PPA1 to 2.0 g. The resulting formulation has a solids content of 68 wt % and 59 vol %, pH of 7.2, wet density of 1.4 grams per milliliter and a viscosity of 75,000 centipoise. The formulation is free of volatile amine and quaternary poly(allylamine) and contains 0.80 wt % polymeric polyamine based on total weight of polymer in the formulation and 28 vol % inorganic filler. Example 13 has storage stability and rapid setting properties according to the Heat Age Stability Test and Washout Resistance Test.

Example 14

Prepare Example 14 in like manner as Example 1 except add an additional 30.0 g of deionized water with ASD-A and increase the amount of PPA1 to 2.0 g. The resulting formulation has a solids content of 64 wt % and 55 vol %, pH of 7.2, wet density of 1.4 grams per milliliter and a viscosity of 40,000 centipoise. The formulation is free of volatile amine and quaternary poly(allylamine) and contains 0.80 wt % polymeric polyamine based on total weight of polymer in the formulation and 28 vol % inorganic filler. Example 14 has storage stability and rapid setting properties according to the Heat Age Stability Test and Washout Resistance Test.

Effect of Different Dispersant

Examples 15 and 16 illustrate that hydrophilic and hydrophobic sodium-neutralized anionic polymers are suitable for use in the formulations of the present invention.

Example 15

Prepare Example 15 in like manner as Example 1 except replace the 3.0 g polyacid pigment dispersant that is 30% solids and free of ammonia and formaldehyde with 1.7 g of a 35 wt % aqueous solution of hydrophilic sodium neutralized anionic polyacid dispersant (for example, TAMOL™ 1254 dispersant) and add an additional 0.5 g of PPA1 to the formulation. The resulting formulation has a solids content of 74 wt % and 66 vol %, pH of 7.2, wet density of 1.4 grams per milliliter and a viscosity of 185,000 centipoise. The formulation is free of volatile amine and quaternary poly (allylamine) and contains 0.20 wt % polymeric polyamine based on total weight of polymer in the formulation and 28 vol % inorganic filler. Example 15 has storage stability and rapid setting properties according to the Heat Age Stability Test and Washout Resistance Test.

Example 16

Prepare Example 16 in like manner as Example 1 except replace the 3.0 g polyacid pigment dispersant that is 30% solids and free of ammonia and formaldehyde with 1.5 g of a 25 wt % aqueous solution of hydrophobically modified sodium neutralized anionic polyacid dispersant (for example, TAMOL™ 731A dispersant) and add an additional 0.5 g of PPA1 to the formulation. The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.20 wt % polymeric polyamine based on total weight of polymer in the formulation and 28 vol % inorganic filler. Example 16 has storage stability and rapid setting properties according to the Heat Age Stability Test and Washout Resistance Test.

Effect of Acids Concentration in ASD

Comparative Example D demonstrate the result of eliminating co-acid MAA from the ASD of Example 1. Examples 17 and 18 illustrate reduced levels of MAA over Example 1. Comparative Example E demonstrate the result of eliminated acrylic acid form the ASD of Example 1. Comparative Example G and Example 19 demonstrate reduced levels of acrylic acid in the ASD relative to Example 1.

Comparative Example D

Prepare Comparative Example D in like manner as Example 1 except replace ASD-A with an equal amount of ASD-B (no MAA). The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.05 wt % polymeric polyamine and 28 vol % inorganic filler. Comparative Example D does not have rapid setting properties according to the Washout Resistance Test.

Example 17

Prepare Example 17 in like manner as Example 1 except replace ASD-A with an equal amount of ASD-C (containing ¼ the amount of MAA relative to ASD-A). The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.10 wt % polymeric polyamine based on total weight of polymer in the formulation and 28 vol % inorganic filler. Example 17 has storage stability and rapid setting properties according to the Heat Age Stability Test and Washout Resistance Test.

Example 18

Prepare Example 18 in like manner as Example 1 except replace ASD-A with an equal amount of ASD-D (containing ½ the amount of MAA relative to ASD-A). The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.10 wt % polymeric polyamine based on total weight of polymer in the formulation and 28 vol % inorganic filler. Example 18 has storage stability and rapid setting properties according to the Heat Age Stability Test and Washout Resistance Test.

Comparative Example F

Prepare Comparative Example F in like manner as Example 1 except replace ASD-A with an equal amount of ASD-G. ASD-G differs from ASD-A by lacking AA and having more MMA (to account for the weight parts that would have been AA). The resulting formulation has a solids content of 74 wt % and 66 vol %, pH of 7.2, wet density of 1.4 grams per milliliter and a viscosity of 1,000,000 centipoise. The formulation is free of volatile amine and quaternary poly(allylamine) and contains 0.10 wt % polymeric polyamine based on total weight of polymer in the formulation and 28 vol % inorganic filler. Comparative Example D does not have storage stability or rapid setting properties according to the Heat Age Stability Test and Washout Resistance Test.

Comparative Example G

Prepare Comparative Example G in like manner as Example 1 except replace ASD-A with an equal amount of ASD-H (containing ⅓ the amount of AA relative to ASD-A). The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.10 wt % polymeric polyamine based on total weight of polymer in the formulation and 28 vol % inorganic filler. Comparative Example G does not have storage stability but does have rapid setting properties according to the Heat Age Stability Test and Washout Resistance Test.

Example 19

Prepare Example 19 in like manner as Example 1 except replace ASD-A with an equal amount of ASD-I (containing ⅔ the amount of AA relative to ASD-A). The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.10 wt % polymeric polyamine based on total weight of polymer in the formulation and 28 vol % inorganic filler. Example 19 has storage stability and rapid setting properties according to the Heat Age Stability Test and Washout Resistance Test.

Effect of Different Acids in ASD

Examples 20-22 illustrate use of ASDs with different acids than the ASD of Example 1.

Example 20

Prepare Example 20 in like manner as Example 1 except replace ASD-A with and equal amount of ASD-E (using itaconic acid instead of MAA). The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.10 wt % polymeric polyamine based on total weight of polymer in the formulation and 28 vol % inorganic filler. Example 20 has storage stability and rapid setting properties according to the Heat Age Stability Test and Washout Resistance Test.

Example 21

Prepare Example 21 in like manner as Example 1 except replace ASD-A with and equal amount of ASD-F (using phosphoethyl methacrylate instead of MAA). The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.10 wt % polymeric polyamine based on total weight of polymer in the formulation and 28 vol % inorganic filler. Example 21 has storage stability and rapid setting properties according to the Heat Age Stability Test and Washout Resistance Test.

Example 22

Prepare Example 22 in like manner as Example 1 except replace ASD-A with and equal amount of ASD-J (Higher Tg composition). Also, increase the amount of PPA1 by 0.5 g. The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.20 wt % polymeric polyamine based on total weight of polymer in the formulation and 28 vol % inorganic filler. Example 22 has storage stability and rapid setting properties according to the Heat Age Stability Test and Washout Resistance Test.

Effect of HEMA

Example 23 illustrates that HEMA is not required to achieve storage stability and rapid setting properties.

Example 23

Prepare Example 21 in like manner as Example 1 except replace ASD-A with and equal amount of ASD-M (No HEMA). The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.10 wt % polymeric polyamine based on total weight of polymer in the formulation and 28 vol % inorganic filler. Example 23 has storage stability and rapid setting properties according to the Heat Age Stability Test and Washout Resistance Test.

Effect of Different Concentration of PPA

Examples 24 and 25 illustrate lower and higher levels of PPA in the formulation, respectively. Comparative Example H illustrate a level of PPA that is too high.

Example 24

Prepare Example 24 in like manner as Example 1 except reduce the amount of PPA-1 from 0.25 g to 0.05 g. The resulting formulation has a solids content of 74 wt % and 66 vol %, pH of 7.2, wet density of 1.4 grams per milliliter and a viscosity of 150,000 centipoise. The formulation is free of volatile amine and quaternary poly(allylamine) and contains 0.02 wt % polymeric polyamine based on total weight of polymer in the formulation and 28 vol % inorganic filler. Example 24 has storage stability and rapid setting properties according to the Heat Age Stability Test and Washout Resistance Test.

Example 25

Prepare Example 25 in like manner as Example 1 except increase the amount of PPA-1 from 0.25 g to 1.25 g. The resulting formulation has a solids content of 74 wt % and 66 vol %, pH of 7.2, wet density of 1.4 grams per milliliter and a viscosity of 500,000 centipoise. The formulation is free of volatile amine and quaternary poly(allylamine) and contains 0.50 wt % polymeric polyamine based on total weight of polymer in the formulation and 28 vol % inorganic filler. Example 25 has storage stability and rapid setting properties according to the Heat Age Stability Test and Washout Resistance Test.

Comparative Example H

Prepare Comparative Example H in like manner as Example 1 except increase the amount of PPA-1 from 0.25 g to 2.5 g. The resulting formulation has a solids content of 74 wt % and 66 vol %, pH of 7.2, wet density of 1.4 grams per milliliter and a viscosity of 1,000,000 centipoise. The formulation is free of volatile amine and quaternary poly (allylamine) and contains 1.0 wt % polymeric polyamine based on total weight of polymer in the formulation and 28 vol % inorganic filler. Comparative Example H does not have storage stability but does have rapid setting properties according to the Heat Age Stability Test and Washout Resistance Test.

Effect of Thickener and Viscosity

Comparative Examples I-L illustrate need for a certain formulation viscosity and that it cannot be achieved by adding any kind of rheology modifier.

Comparative Example I

Prepare Comparative Example I in like manner as Example 1 except do not include the hydroxyethyl cellulose thickener. The resulting formulation has a solids content of 74 wt % and 66 vol %, pH of 7.2, wet density of 1.4 grams per milliliter and a viscosity of 9,000 centipoise. The formulation is free of volatile amine and quaternary poly (allylamine) and contains 0.1 wt % polymeric polyamine based on total weight of polymer in the formulation and 28 vol % inorganic filler. Comparative Example I does not have rapid setting properties according to the Washout Resistance Test.

Comparative Example J

Prepare Comparative Example J in like manner as Example 1 except reduce the amount of hydroxyethyl cellulose thickener from 0.4 g to 0.1 g. The resulting formulation has a solids content of 74 wt % and 66 vol %, pH of 7.2, wet density of 1.4 grams per milliliter and a viscosity of 45,000 centipoise. The formulation is free of volatile amine and quaternary poly(allylamine) and contains 0.1 wt % polymeric polyamine based on total weight of polymer in the formulation and 28 vol %

Comparative Example K

Prepare Comparative Example K in like manner as Example 1 except replace the hydroxyethyl cellulose thickener with 0.74 g of a 28 wt % solids alkali-soluble anionic thickener (ACRYSOL™ ASE-60 thickener; ACRYSOL is a trademark of The Dow Chemical Company). The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.1 wt % polymeric polyamine based on total weight of polymer in the formulation and 28 vol % inorganic filler. Comparative Example K does not have rapid setting properties according to the Washout Resistance Test.

Comparative Example L

Prepare Comparative Example L in like manner as Example 1 except replace the hydroxyethyl cellulose thickener with 1.29 g of a 19 wt % solids aqueous hydrophobically modified ethylene oxide-based urethane block copolymer (ACRYSOL™ RM-12W thickener). The resulting formulation has a solids content of 74 wt % and 66 vol %, pH of 7.2, wet density of 1.4 grams per milliliter and a viscosity of 185,000 centipoise. The formulation is free of volatile amine and quaternary poly(allylamine) and contains 0.1 wt % polymeric polyamine based on total weight of polymer in the formulation and 28 vol % inorganic filler. Comparative Example L does not have rapid setting properties according to the Washout Resistance Test.

The invention claimed is:

1. A formulation comprising in a single formulation the following three components: an anionically stabilized dispersion of polymer particles, a polymeric polyamine and a inorganic filler wherein:
  (a) the polymer particles of the anionically stabilized dispersion are present at a concentration of 28 weight-percent or more and at the same time 45 weight-percent or less based on total weight of the formulation as determined according to ASTM E1131-08;
  (b) the polymer particles of the anionically stabilized dispersion comprise polymers selected from a group consisting of (meth)acrylic polymers and styrene-acrylic copolymers; the polymers containing on average
    (i) 0.7 weight-percent or more and 5.0 weight-percent or less polymerized acrylic acid based on total weight of all monomers in the polymer; and
    (ii) 0.1 weight-percent or more and 5.0 weight-percent or less of polymerized acid other than acrylic acid based on total weight of all monomer in the polymer;
  (c) the polymer particles of the anionically stabilized dispersion
    (i) have an average particle size of 200 nanometer or more and 600 nanometer or less as determined by 90-degree light scattering using a Malvern Zetasizer Nano ZS90; and
    (ii) have an average glass transition temperature of −55 degrees Celsius or more and 20 degrees Celsius or less as determined according to ASTM E-1356-08;
  (d) the concentration of polymeric polyamine is 0.05 weight-percent or more and less than 1.0 weight-percent based on total weight of polymer in the formulation as determined by pyrolysis headspace gas chromatography;
  (e) the inorganic filler concentration is 10 volume-percent or more and 45 volume-percent or less based on total volume of the formulation as determined by ASTM method D5201-05a;
  (f) the formulation is 60 volume-percent or more and 70 volume-percent or less solids as determined by ASTM D5201-05a;
  (g) the formulation has a viscosity greater than 15000 centipoise; and
wherein, if the formulation comprises a rheology modifier thickener, the rheology modifier is a nonionic volume exclusion thickener;
wherein the anionic stabilized dispersion of polymer particles is free of aminosilanes;
wherein the formulation contains less than 500 weight parts per million weight parts volatile base relative to total formulation weight and is free of quaternary poly(allylamine);
wherein the formulation has a pH of 6.0 or higher and 8.5 or lower as determined by ASTM E-70; and
wherein viscosity values are determined using a Brookfield viscometer model DV-I+ at 5 revolutions per minute using a Helipath Spindle E at 22 degrees Celsius.

2. The formulation of claim 1, wherein the polymerized acid other than acrylic acid in the polymer of the dispersed polymer particles is one or any combination of more than one selected from a group consisting of methacrylic acid, itaconic acid, maleic acid, fumaric acid, phosphoethyl methacrylate and phosphate esters of polyethylene glycol monomethacrylate.

3. The formulation of claim 1, wherein the polymeric polyamine is any one or any combination of more than one selected from a group consisting of poly-oxazolidineoethylmethacrylate, poly(N,N-dimethylaminoethyl methacrylate), poly(2-aminoethyl methacrylate), polyethyleneimine, and polymeric aminosiloxanes.

4. The formulation of claim 3, wherein the polymeric polyamine is selected from a group consisting of poly (oxazolidinoethyl methacrylate), branched polyethyleneimine, poly(N,N-dimethylaminoethyl methacrylate), poly (aminoethyl aminopropyl siloxane) and poly(2-aminoethyl methacrylate).

5. The formulation of claim 1, wherein the inorganic filler is one or any combination of more than one material selected from a group consisting of metal oxides, calcium carbonate and sodium-potassium alumina silicates.

6. The formulation of claim 1, wherein the formulation further comprises a rheology modifier selected from a group consisting of hydroxyethyl cellulose, hydroxyethyl methyl cellulose, polyvinyl alcohol, and polyvinylpyrrolidone.

7. The formulation of claim 1, wherein the formulation further comprises a rheology modify at a concentration of more than 0 weight-percent and at 1.0 wt % or less based on total weight of the formulation.

8. The formulation of claim 1, wherein the pH of the formulation is less than 7.5 as determined by ASTM E-70.

9. The formulation of claim 1, wherein the formulation is free of polyimine.

10. The formulation of claim 1, wherein the polymeric polyamine contains 4.0 or more amine functional groups per hydroxyl functional group.

* * * * *